United States Patent
Shin

(10) Patent No.: US 10,158,798 B2
(45) Date of Patent: Dec. 18, 2018

(54) IMAGING APPARATUS AND METHOD OF CONTROLLING THE SAME

(71) Applicant: SAMSUNG ELECTRONICS CO., LTD., Suwon-si, Gyeonggi-do (KR)

(72) Inventor: Seung Kyoon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 14/205,778

(22) Filed: Mar. 12, 2014

(65) Prior Publication Data

US 2014/0300688 A1 Oct. 9, 2014

(30) Foreign Application Priority Data

Apr. 8, 2013 (KR) .......................... 10-2013-0038246

(51) Int. Cl.
*H04N 5/232* (2006.01)
*H04N 5/341* (2011.01)
*G03B 37/02* (2006.01)

(52) U.S. Cl.
CPC ......... *H04N 5/23238* (2013.01); *G03B 37/02* (2013.01); *H04N 5/23293* (2013.01); *H04N 5/3415* (2013.01)

(58) Field of Classification Search
CPC .................. H04N 5/23238; H04N 5/23293
See application file for complete search history.

(56) References Cited

U.S. PATENT DOCUMENTS

| 5,045,872 | A  | * | 9/1991  | Yoshimura | G03B 37/02 396/20 |
| 7,222,021 | B2 | * | 5/2007  | Ootomo    | G01C 15/00 348/36 |
| 2005/0219401 | A1 | * | 10/2005 | Oikawa    | H04N 5/2254 348/345 |
| 2008/0055272 | A1 | * | 3/2008  | Anzures   | G06F 1/1626 345/173 |
| 2009/0033767 | A1 | * | 2/2009  | Fujiyama  | H04N 5/23238 348/231.2 |
| 2009/0058990 | A1 | * | 3/2009  | Kim       | G03B 37/04 348/36 |
| 2010/0302347 | A1 | * | 12/2010 | Shikata   | H04N 5/232 348/36 |
| 2012/0075412 | A1 | * | 3/2012  | Miyamoto  | G03B 35/00 348/36 |
| 2012/0105682 | A1 |   | 5/2012  | Hata et al. | |

(Continued)

FOREIGN PATENT DOCUMENTS

JP 2012-099917 A 5/2012

*Primary Examiner* — Twyler L Haskins
*Assistant Examiner* — Wesley J Chiu
(74) *Attorney, Agent, or Firm* — Jefferson IP Law, LLP

(57) ABSTRACT

Disclosed herein is an imaging apparatus including a main body, an imaging unit mounted on the main body that captures an image of an object, an input unit that receives a command to capture the image, a controller that controls operation of the imaging unit to create a panoramic image when a panorama mode is input to the input unit and that determines a current progress angle and a remaining angle to complete creation of the panoramic image based on the operation of the imaging unit during creation of the panoramic image, and a display unit that displays shooting angle information for creation of the panoramic image with a live view.

19 Claims, 12 Drawing Sheets

(56) References Cited

U.S. PATENT DOCUMENTS

| | | | | |
|---|---|---|---|---|
| 2012/0120187 A1* | 5/2012 | Goto | G03B 37/02 | 348/36 |
| 2012/0120188 A1* | 5/2012 | Arai | H04N 5/23238 | 348/36 |
| 2012/0293607 A1* | 11/2012 | Bhogal | G06T 3/4038 | 348/36 |
| 2012/0320149 A1* | 12/2012 | Kim | H04N 5/23238 | 348/36 |
| 2013/0033566 A1* | 2/2013 | Sento | G03B 37/02 | 348/36 |
| 2013/0141524 A1* | 6/2013 | Karunamuni | G06T 3/4038 | 348/38 |
| 2014/0118479 A1* | 5/2014 | Rapoport | H04N 1/00183 | 348/36 |
| 2014/0152765 A1* | 6/2014 | Okuda | H04N 5/23238 | 348/36 |
| 2015/0124047 A1* | 5/2015 | Yatziv | H04N 5/23293 | 348/37 |
| 2015/0312478 A1* | 10/2015 | Barcovschi | H04N 5/23216 | 348/36 |

\* cited by examiner

IMAGING APPARATUS AND METHOD OF CONTROLLING THE SAME

CROSS-REFERENCE TO RELATED APPLICATION(S)

This application claims the benefit of Korean Patent Application No. 10-2013-0038246, filed on Apr. 8, 2013 in the Korean Intellectual Property Office, the disclosure of which is incorporated herein by reference.

BACKGROUND

1. Field

Embodiments of the present invention relate to an imaging apparatus capable of producing a panoramic image and a method of controlling the same.

2. Related Art

An imaging apparatus is a device that captures still images or videos by recording images of people, objects, and landscapes. Recently, development of digital imaging apparatuses, which obtain data from light incident upon an image pickup device, store the data in a storage medium as a file, or display an image on a display unit, has been vigorously carried out.

A digital imaging apparatus includes a digital camera that captures images as a primary function. The digital imaging apparatus may be incorporated into many terminal devices such as mobile phones, personal digital assistants (PDAs), notebook computers, and personal computers (PCs) in an integrated or separated state as an imaging module including elements required to capture images of the object.

Some examples of digital imaging apparatuses have a function of creating a panoramic image. By use of this function, an image with horizontally elongated fields of view, which cannot be acquired using a wide-angle lens, may be produced.

A method of producing a panoramic image will be briefly described.

During creation of a panoramic image, an imaging apparatus displays a live view of an object to be currently captured on a display unit and additionally displays previously captured images on a portion of the display unit.

A user captures a first image, which is a portion of the entire panoramic image, while watching a live view of the first image displayed on the display unit of the imaging apparatus.

Then, the user pans the imaging apparatus along a shooting direction while watching a live view screen on the display unit of the imaging apparatus and captures a second image next to the first image.

In this case, the user adjusts the shooting direction suitably in the frontward, backward, leftward, and rightward directions such that the first image and the second image have continuity while watching the second image to be captured through the live view screen. Here, continuity indicates that the first image and the second image are continuously and smoothly connected in a resultant panoramic image As described above, the user captures a current image while watching the current image and previously captured images displayed on the live view screen when the imaging apparatus is rotated to obtain a panoramic image. The user captures the second image to be connected to the first image based upon the user's technique.

Thus, while a panoramic image is created, the user is unable to know the current status of completion for producing a panoramic image and is unable to know an estimated remaining percentage for completion of the task.

In particular, imaging apparatuses have different maximum angles for producing a panoramic image according to characteristics and focal length of the lens. Thus, the user needs to test the maximum angles for producing the panoramic image according to the characteristics and focal length of the lens and to remember test results before capturing images.

SUMMARY

Various embodiments provide an imaging apparatus that outputs information regarding the degree of progress in creating a panoramic image in a panorama mode, and a method of controlling the same.

Other embodiments provide an imaging apparatus that outputs information regarding the degree of progress for creation of a panoramic image in a panorama mode using a progress bar, and a method of controlling the same.

Still other embodiments provide an imaging apparatus capable of detecting a maximum angle for creating a panoramic image based on a focal length in a panorama mode and outputting the detected maximum angle, and a method of controlling the same.

Additional embodiments will be set forth in part in the description which follows and, in part, will be apparent from the description, or may be learned by practice of the invention.

In one embodiment, an imaging apparatus includes a main body, an imaging unit mounted on the main body that captures an image of an object, an input unit that receives a command to capture the image, a controller that controls operation of the imaging unit to create a panoramic image when a panorama mode is input to the input unit and that determines a current progress angle and a remaining angle to complete creation of the panoramic image based on the operation of the imaging unit during creation of the panoramic image, a display unit that displays shooting angle information for creation of the panoramic image with a live view.

The imaging apparatus may further include a storage unit that stores a maximum angle for creation of the panoramic image based on a focal length. The controller checks a maximum angle for creation of the panoramic image while shooting based on a focal length adjusted by the input unit and controls display of the checked maximum angle.

The display unit may display the shooting angle information for creation of the panoramic image with the live view using a progress bar.

The display unit may vertically display the progress bar when the panoramic image is created by vertically rotating the main body with respect to an axis of a lens of the imaging unit and may horizontally display the progress bar when the panoramic image is created by horizontally rotating the main body with respect to the axis of the lens of the imaging unit.

The progress bar may indicate a current progress angle relative to the maximum angle based on the degree of progress during creation of the panoramic image and indicates the progress angle and the remaining angle differently.

The progress bar may have a completed portion that displays previously captured images and a remaining portion that displays the remaining angle as characters.

The display unit may further include a shooting angle bar disposed adjacent to the progress bar parallel to a direction in which the progress bar proceeds and that indicates an initial angle, a maximum angle, and a progress angle, and the progress bar may have a completed portion that displays previously captured images and a remaining portion that displays the remaining angle as characters.

The shooting angle bar may further indicate angles at intervals of a predetermined angle.

The shooting angle bar may include scale marks that indicate the predetermined angles.

The shooting angle bar may indicate the initial angle at a first end of the progress bar, indicate the maximum angle at a second end of the progress bar, and indicate the progress angle between the first end and the second end.

The display unit may display a shooting direction of the panoramic image using a shooting direction-indication unit.

The input unit may receive a view mode and controls operation of the display unit when the view mode is converted from a live view mode into a viewfinder mode.

The imaging apparatus may further include a sound output unit to output sounds. The controller controls the sound output unit to output shooting angle information as a sound for creation of the panoramic image.

In accordance with another embodiment, an imaging apparatus includes a main body, an imaging unit mounted on the main body that captures an image of an object, a storage unit that stores a maximum angle corresponding to a focal length, an input unit that receives a command to capture the image, a controller that checks a focal length of the imaging unit when a panorama mode is input, checks a maximum angle corresponding to the checked focal length, determines a current progress angle of a panoramic image creation operation, and determines a remaining angle to complete creation of the panoramic image based on the maximum angle and the progress angle, and a display unit that displays the remaining angle.

In accordance with another embodiment, a method of controlling an imaging apparatus includes checking a focal length of an imaging unit when a panorama mode is input to an input unit, checking a maximum angle corresponding to the checked focal length, performing a panoramic image creation operation by operating the imaging unit when a panoramic image creation operation is input to the input unit, determining a current progress angle while creating the panoramic image, determining a remaining angle to complete creation of the panoramic image based on the maximum angle and the progress angle, and displaying the determined remaining angle on a display unit.

The determining of the current progress angle may include determining a viewing angle corresponding to the focal length, detecting a rotation angle of a main body of the imaging apparatus, and determining the progress angle based on the determined viewing angle and the rotation angle.

The method may further include displaying the maximum angle and the progress angle on the display unit.

The maximum angle, the progress angle, and the remaining angle may be displayed using a progress bar.

The progress bar may have one portion displaying a preview image and the other portion displaying a remaining angle.

The progress bar may have a first portion displaying a preview image and a second portion left blank, and the method may further include displaying a shooting angle bar adjacent to the progress bar.

The method may further include determining a shooting direction for the panoramic image creation operation, and vertically displaying the progress bar when the shooting direction is a vertical direction and horizontally displaying the progress bar when the shooting direction is a horizontal direction.

The method may further include determining whether the progress angle is equal to the maximum angle, and stopping the panoramic image creation operation when the progress angle is equal to the maximum angle.

The method may further include determining whether a command to stop the panoramic image creation operation is input to the input unit, and stopping the panoramic image creation operation when the command to stop the panoramic image creation operation is input.

According to an embodiment, the imaging apparatus displays the current progress angle relative to the maximum angle for producing a panoramic image or the remaining angle in the panorama mode. Thus, the user may accurately recognize the degree of progression in creating the panoramic image and recognize a distance corresponding to the remaining angle to be captured. That is, the user may conveniently perform the panoramic image creation operation.

In addition, the user may acquire information regarding the maximum angle of the imaging apparatus to create a panoramic image regardless of characteristics of the lens of the focal length of the imaging apparatus.

Thus, the imaging apparatus may automatically provide the user with information regarding characteristics of the internal lens and the maximum angle for panoramic image creation corresponding to the focal length. Accordingly, the user does not need to directly test the imaging apparatus to acquire information regarding the characteristics of the internal lens and the maximum angle for panoramic image creation corresponding to the focal length.

As described above, the panoramic image may be more conveniently and efficiently created since the user may sequentially and instinctively recognize the maximum angle for producing the panoramic image, the progress angle, and the remaining angle.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
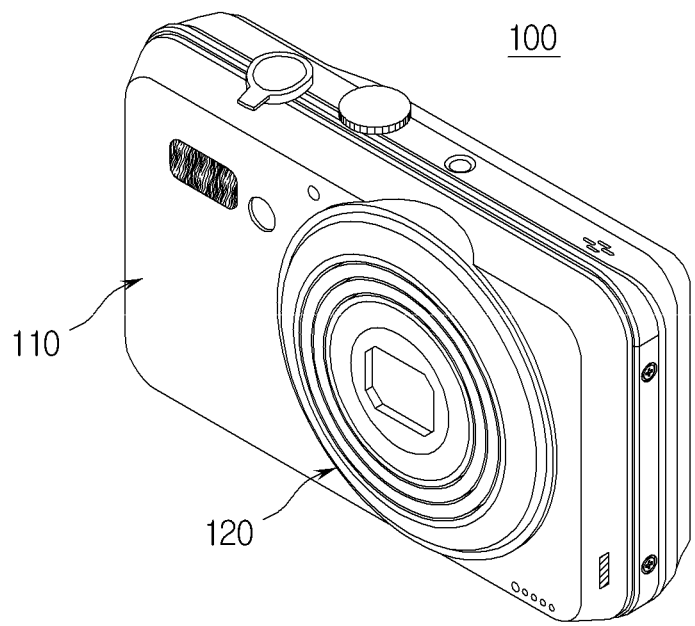
FIGS. 1 and 2 illustrate an imaging apparatus according to an embodiment.

Reference will now be made in detail to the embodiments, examples of which are illustrated in the accompanying drawings, wherein like reference numerals refer to like elements throughout.

Figure 2:
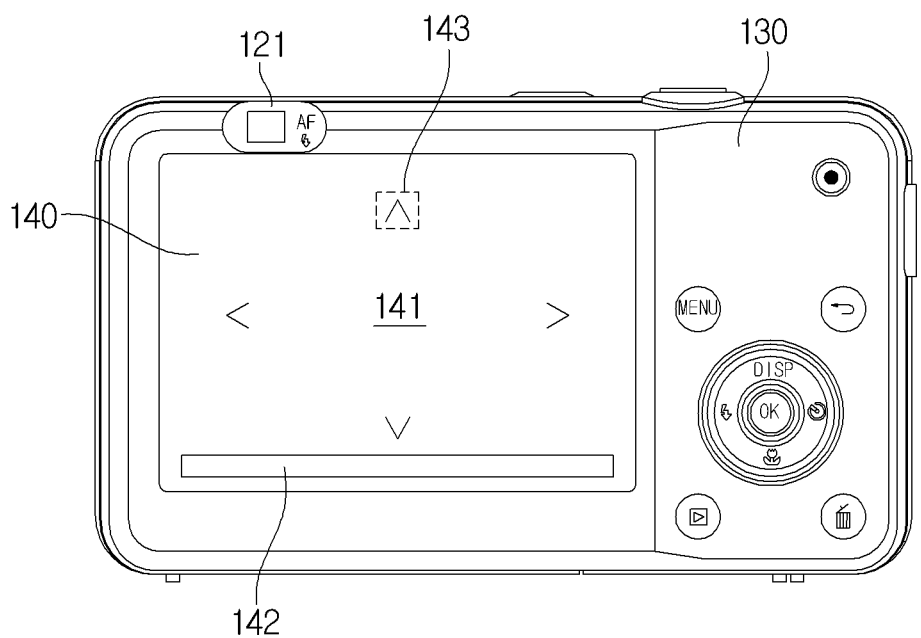
Figure 3:
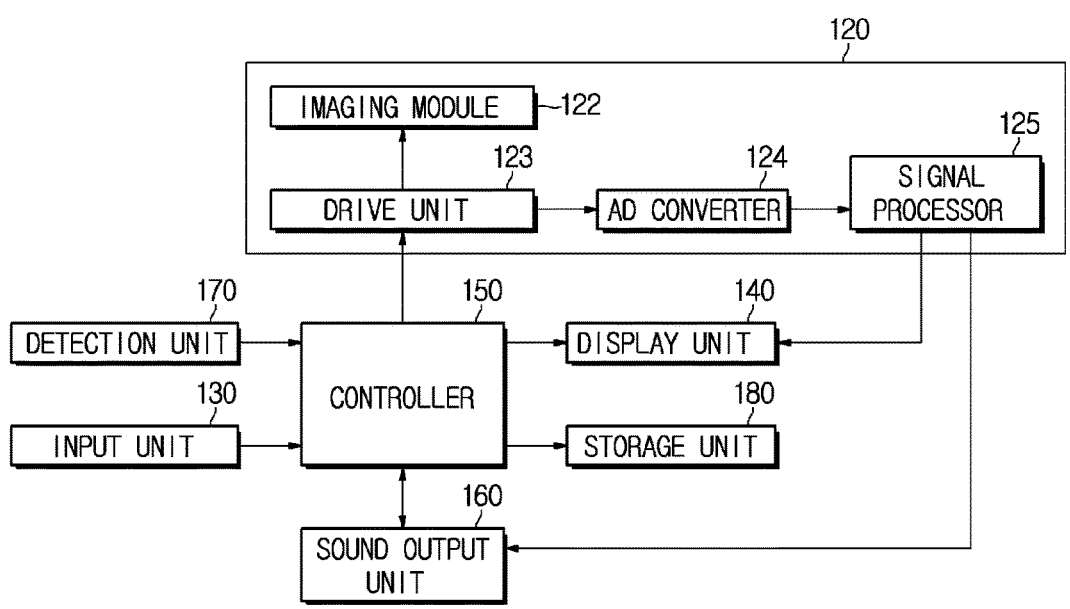
FIG. 3 is a schematic block diagram illustrating the imaging apparatus of FIG. 1, according to an embodiment.

FIG. 1 illustrates a first surface of an imaging apparatus 100 according to an embodiment. FIG. 2 illustrates a second surface of the imaging apparatus 100. FIG. 3 is a schematic block diagram illustrating the imaging apparatus 100.

FIGS. 1 and 2 illustrate one embodiment of a digital camera, which captures an image of an object, converts the image into digital data, and stores the digital data in a storage medium, as an example of the imaging apparatus 100, In this regard, the imaging apparatus 100 may include a digital camera or a camcorder, which acquire a still image or a moving image, as a primary function, or may include a terminal device, which additionally includes an imaging module capable of acquiring a still image and a moving image. In this case, the terminal device includes a mobile phone, a personal digital assistant (PDA), a notebook computer, a personal computer (PC), or a tablet PC. The terminal device including an imaging module may be used to place voice calls and video calls, display content, or execute applications in addition to capturing images.

The imaging apparatus 100 in one example has a panorama mode function in which a panoramic image with a wider view than a still image may be produced.

Here, in the panorama mode, a plurality of still images of an object are captured over time while panning the imaging apparatus 100 in one or more directions to create a wide continuous image of the object, e.g., a landscape, as a single frame. In this case, a panoramic image refers to a substantially continuous scene generated by overlapping the plurality of still images.

As illustrated in FIG. 1 and FIG. 2, the imaging apparatus 100 includes a main body 110, an imaging unit 120, an input unit 130, and a display unit 140.

The main body 110 forms an outer structure or appearance of the imaging apparatus 100.

Turning to FIG. 3, in the main body 110, a controller 150, a storage unit 180, a detection unit 170, and a sound output unit 160 are further configured in addition to the imaging unit 120, the input unit 130, and the display unit 140.

The imaging unit 120 is mounted on the main body 110 in a fixed or separated state and acquires an image of an external object.

The imaging unit 120 includes a viewfinder 121, an imaging module 122 to capture an image of the object, a drive unit 123 to drive the imaging module 122, an analog-to-digital (AD) converter 124, and a signal processor 125.

The viewfinder 121 through which a user views the object is an optical device used to define a frame of an in-focus object. The viewfinder 121 may be integrated with the imaging module 122 or separately disposed.

The imaging module 122 includes one or more of a lens (not shown) where an image of the object is formed, an iris (not shown) that controls an amount of light incident on an image sensor (not shown), a shutter (not shown) that opens and closes the iris to allow light to pass toward the image sensor in an amount suitable for brightness of the object, the image sensor such as a charge coupled device (CCD) or a complementary metal oxide semiconductor (CMOS) device as an image pickup device, or an RGB color filter (not shown).

General principles of photography by the imaging module 122 will be briefly described. When a shutter button (e.g., of the input unit 130) for the imaging module 122 is pressed, light is allowed to pass through the lens and the iris. In this case, light passing through the lens and the iris arrives at a CCD, as an image sensor, and the intensity of the light from the lens is recorded in the CCD.

In this case, the CCD is a light sensitive semiconductor device that converts light into electrical signals. Light from the obtained image is split into various colors by the RGB color filter adjacent to the CCD, and the split colors are converted into electrical signals by, for example, hundreds of thousands of photosensitive devices that implement the CCD.

In this case, the electrical signal is converted into a digital signal 0 or 1 by the AD converter 124 so as to be converted into an image file.

The signal processor 125 in one example performs compression or elongation of image data in a JPEG format, as a still image compression algorithm, developed by the International Standard Organization (ISO) and transmits the image data to the storage unit 180.

In addition, the signal processor 125 may also perform digital signal processing of the image data such as gamma correction, white balance change, and the like.

In addition, the image data output from the signal processor 125 may be displayed on the display unit 140.

For example, the imaging unit 120 converts the image of the object into electrical signals, converts the electrical signals into digital signals, and then transmits the digital signals to the storage unit 180.

The input unit 130 receives a command from a user and transmits electrical signals corresponding to the input command to the controller 150. Here, the electrical signals are transmitted from the input unit 130 to the controller 150 such that the controller 150 controls the imaging unit 120 based on the electrical signals.

In this case, the input unit 130 is different from a user interface provided by the display unit 140. While the user interface of the display unit 140 may be a software-based graphical user interface allowing touch input, the input unit 130 is a hardware-based unit for mechanical manipulation.

The input unit 130 includes one or more of an arrow key, a command dial, a wheel, or other buttons having various forms.

The input unit 130 receives commands to initiate and stop an image capture operation and a selected image capture mode for capturing a normal image or a panoramic image.

The input unit 130 receives commands to perform zoom-in and zoom-out operations to control the displayed size of the object while capturing an image. Here, a focal length, which is a distance between the image sensor (of the imaging module 122) and the lens (optical center) in the imaging unit 120, is determined by the zoom-in and zoom-out operations.

Here, the zoom-in operation refers to "approaching" the object by increasing the focal length of the lens under the condition that the position of the main body 110 is fixed, so that the object is magnified and a depth of field decreases. The zoom-out operation refers to "distancing" the object by decreasing the focal length of the lens under the condition that the position of the main body 110 is fixed, so that the object is shrunk and the depth of field increases.

The input unit 130 receives a selected shooting direction when the panorama mode is selected. Here, the selected shooting direction may also be input through a touchscreen as the display unit 140.

An output mode to output shooting angle information for creating the panoramic image may be selected via the input unit 140.

The display unit 140 is mounted on the main body 110 and displays an image.

More particularly, the display unit 140 displays an image of the object input through the lens in a live view mode before capturing the image. In addition, the display unit 140 may stop displaying the image when in a viewfinder mode.

The display unit 140 may also display a preview of a previously captured image while displaying the image to be captured in the panorama mode.

The display unit 140 may also load an image stored in the storage unit 180 to replay or review the image according to a user command.

The display unit 140 may be a touchscreen.

For example, the display unit 140 may also display additional information such as menu information regarding the image capture or option setting information to set a variety of shooting options together with the image while performing the live view mode or while replaying the image. Here, the display unit 140 may display the additional information to overlap the image.

Referring to FIG. 2, the display unit 140 includes an image display unit 141 in which a live view or a replay image is displayed and an information display unit 142 in which shooting options such as image capture mode, shutter speed, aperture value, or information regarding exposure are displayed. The display unit 140 may further include a shooting direction display unit 143 in which the shooting directions such as leftward, rightward, upward, and downward directions are displayed such that the selected shooting direction of the panorama mode is displayed.

The display unit 140 may further include a unit indicating the degree of progress in creating a panoramic image, for example, a progress state indicator 145 (FIG. 5), in which information regarding the degree of progress in creating the panoramic image is displayed in the panorama mode.

The progress state indicator 145 displays a remaining angle to complete creation of the panoramic image.

In addition, the progress state indicator 145 may also display an initial angle, a progress angle, and a maximum angle. Here, the progress state indicator 145 displays degree of progress in creating the panoramic image using a progress bar. For example, the progress state indicator 145 displays the progress bar while adjusting the progress bar in accordance with the degree of progress in creating the panoramic image.

As described above, since the display unit 140 displays the progress angle, the user may more easily recognize the degree of progress in creating a panoramic image, thereby efficiently and conveniently producing the panoramic image.

Referring to FIG. 3, the controller 150, the storage unit 180, the detection unit 170, and the sound output unit 160 will be described.

The controller 150 controls operation of the imaging unit 120 when the image capture mode is selected via the input unit 130. For example, the controller 150 controls operations of the lens, the iris, the shutter, and the image sensor, as an image pickup device, to capture an image.

When the controller 150 determines that the panorama mode is selected from the image capture modes, the controller 150 checks the focal length, which is a distance between the lens and the image sensor in the imaging unit 120 and checks a maximum angle corresponding to the checked focal length.

When the controller 150 determines that a command to initiate a panoramic image creation operation is input to the input unit 130, the controller 150 drives the imaging unit 120 to create the panoramic image and detects the progress angle of the current state relative to the whole panoramic image creation operation.

Here, the controller 150 determines a viewing angle corresponding to the focal length to determine the progress angle of the current state, checks a rotation angle of the main body 110 detected by the detection unit 170, and determines the progress angle based on the determined viewing angle and the rotation angle.

The controller 150 determines a remaining angle in which images will be further captured based on the maximum angle and the progress angle.

The controller 150 controls display of one or more of the initial angle, the progress angle, the maximum angle, or the remaining angle.

In this regard, the controller 150 controls the display unit 140 such that shooting angle information is displayed using a progress bar which gradually increases in size as the progress angle increases.

Upon determination that the panorama mode is selected, the controller 150 determines the shooting direction for creating a panoramic image. Upon determination that the shooting direction is a vertical direction (e.g., when the panoramic image is created by vertically rotating the main body 110 with respect to an axis of a lens of the imaging unit 120), the controller 150 controls the progress bar to be vertically displayed. Upon determination that the shooting direction is a horizontal direction (e.g., when the panoramic image is created by horizontally rotating the main body 110 with respect to the axis of the lens of the imaging unit 120), the controller 150 controls the progress bar to be horizontally displayed.

Upon determination that the output mode is selected by the input unit 130, the controller 150 controls to display shooting angle information for creating the panoramic image based on the selected output mode.

When the progress angle is equal to the maximum angle or when a command to stop the image capture operation is input by the user, the controller 150 controls operation of the imaging unit 120 to stop the panoramic image creation operation.

The controller 150 determines whether the view mode is selected by the input unit 130.

Here, upon determination that the view mode is a live view mode, the controller 150 controls displaying of an image of the object captured by the imaging unit 120 as a live view on the display unit 140.

Upon determination that the view mode is a viewfinder mode, the controller 150 controls operation of the display unit 140 to be stopped and controls operation of the viewfinder while outputting the shooting angle information for creating the panoramic image as sound.

Upon determination that the progress angle is less than the maximum angle by a preset angle, the controller 150 may control output of a first sound. Upon determination that the progress angle is equal to the maximum angle, the controller 150 may control output of a second sound.

The storage unit 180 stores information regarding image capture options selected by the user.

The storage unit 180 stores maximum angles based on focal lengths in the panorama mode and stores viewing angles based on the focal lengths in the normal image mode.

Examples of the maximum angles based on the focal lengths in the panorama mode are as follows. When the focal length is 20 mm, the maximum angle is approximately 120°. When the focal length is 50 mm, the maximum angle is approximately 90°.

Examples of the viewing angles based on focal lengths contained in one frame in the normal image mode are as follows. When the focal length is 50 mm, the viewing angle is approximately 46°. When the focal length is 28 mm, the viewing angle is approximately 74°. When the focal length is 135 mm, the viewing angle is approximately 20°.

The storage unit 180 includes a read only memory (ROM), a random access memory (RAM), or the like.

In addition, the storage unit 180 may store captured images. A separate storage unit for storing the captured image may also be used.

The storage unit 180 may also store a sound to notify that the progress angle is equal to the maximum angle.

The detection unit 170 detects a rotation angle of the main body 110 and transmits the detected rotation angle to the controller 150.

The sound output unit 160 outputs shooting angle information as sound in the panorama mode.

The sound output unit 160 may output a first sound when the progress angle is less than the maximum angle by a preset angle and may output a second sound when the progress angle is equal to the maximum angle.

For example, as one example where the maximum angle is 180° and the preset angle is 20°, the sound output unit 160 outputs the first sound, when the progress angle is 160°, and outputs the second sound, when the progress angle is 180°.

In addition, the sound output unit 160 may output sounds of a moving image while displaying the moving image stored in the storage unit 180 on the display unit 140.

The sound output unit 160 may also output sounds of content while displaying the content on the display unit 140. The sound output unit 160 includes a speaker.

The imaging apparatus 100 may further include a sound input unit (not shown) through which sound information regarding a moving image is input while shooting the moving image. The sound input unit includes a microphone.

Figure 4:
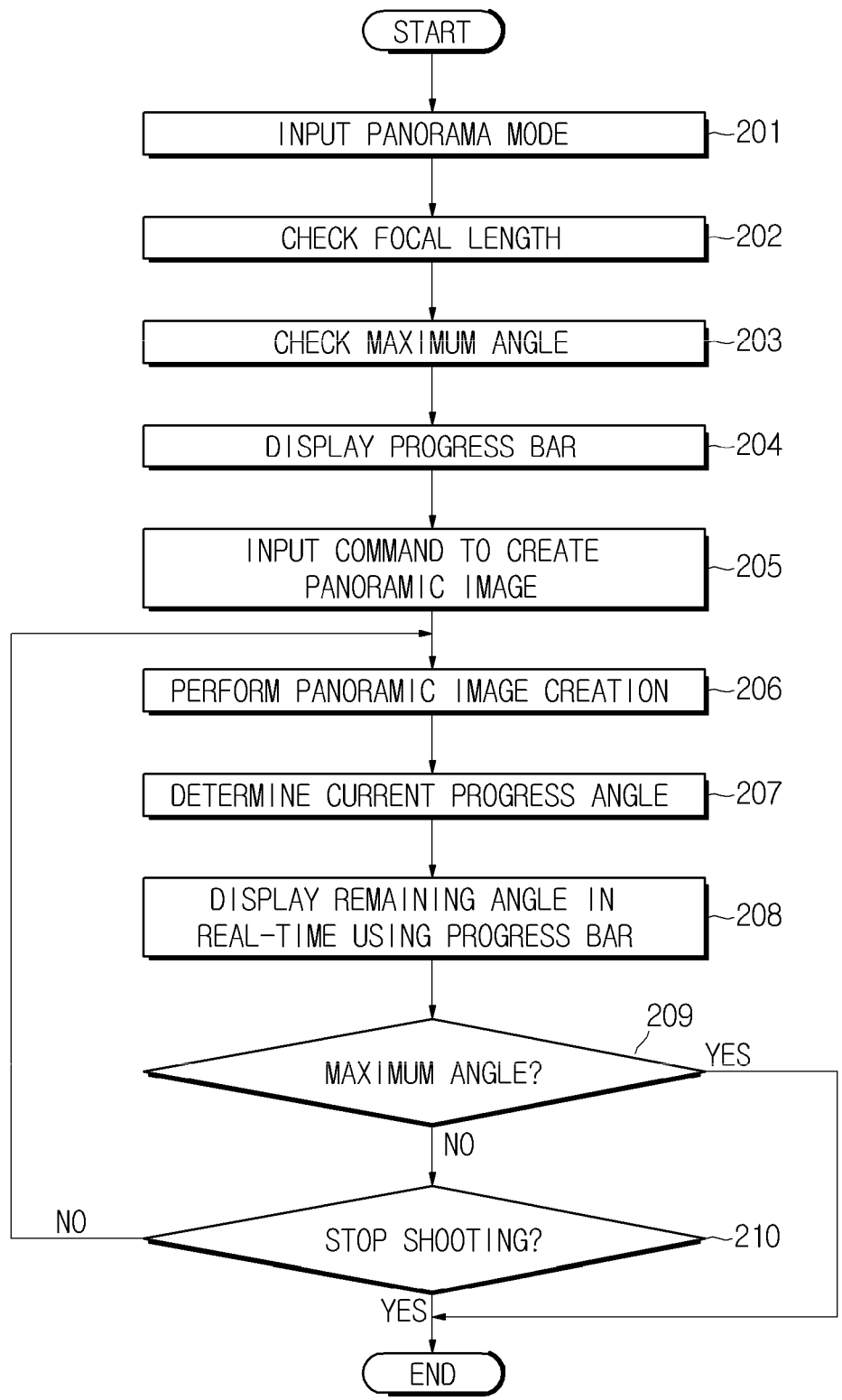
FIG. 4 is a flowchart illustrating a method of controlling the imaging apparatus of FIG. 1, according to an embodiment.

FIG. 4 is a flowchart illustrating a method of controlling an imaging apparatus 100 according to an embodiment. The method will be described with reference to FIGS. 1 to 3.

When power is turned on, the imaging apparatus 100 supplies drive power to one or more of the components.

The imaging apparatus 100 checks a current operation mode set by an input unit when power is supplied from a battery (not shown).

Upon determination that the current operation mode is not an image capture mode, the imaging apparatus 100 enters a standby mode or a display mode in which previously captured images are displayed.

On the other hand, when the imaging apparatus 100 determines that the current operation mode is an image capture mode, the imaging unit 120 is driven to perform an image capture operation.

In this regard, the imaging apparatus 100 determines whether the image capture mode is a normal image mode for capturing a still image or a panorama mode for creating a panoramic image.

For example, the imaging apparatus 100 determines the image capture mode based on a command input via the input unit 130. Upon determination that the normal image mode is input to the input unit 130, the imaging apparatus 100 performs an image capture operation in the normal image mode. Upon determination that the panorama mode is input to the input unit 130, the imaging apparatus 100 performs an image capture operation in the panorama mode.

Here, the imaging apparatus 100 controls operations of one or more of a lens, an iris, a shutter, or an image sensor, as an image pickup device, to capture an image of the object.

A process of creating the panoramic image will be described in more detail.

When the panorama mode is input (201), the imaging apparatus 100 checks a focal length that is a distance between the lens and the image sensor in the imaging unit (202). Here, the focal length is a distance adjusted via a zoom-in or zoom-out operation.

Then, the imaging apparatus 100 checks a maximum angle corresponding to the checked focal length (203).

Then, the imaging apparatus 100 displays a progress bar, which is the progress state indicator 145, on a portion of the display unit 140 while displaying a live view on the display unit 140 (204).

Furthermore, the imaging apparatus 100 may also display shooting option information such as an image capture mode, shutter speed, aperture value, or information regarding exposure on the display unit 140.

In addition, the imaging apparatus 100 displays the shooting direction display unit 143 through which the selected shooting direction for creation of the panoramic image, such as leftward, rightward, upward, or downward directions, is displayed on the display unit 140.

Here, the user selects a shooting direction. For example, the user selects one direction selected from the group consisting of the leftward, rightward, upward, and downward directions displayed on the display unit 140. The user may also select one direction selected from the group consisting of the leftward, rightward, upward, and downward directions via the input unit.

The imaging apparatus 100 determines the input shooting direction in the panorama mode. Upon determination that the shooting direction is a vertical direction, the progress bar is vertically displayed. Upon determination that the shooting direction is a horizontal direction, the progress bar is horizontally displayed.

Here, the direction of the progress bar may be determined by the user as the horizontal or vertical direction regardless of the shooting direction.

Then, upon determination that a command to create a panoramic image is input to the input unit 130 (205), the imaging apparatus 100 determines whether the view mode is a live view mode or a viewfinder mode. Upon determination that the view mode is the live view mode, the imaging apparatus 100 displays a live view of an image to be captured on the display unit 140 while panning the main body 110 and perform a panoramic image creation operation (206).

Here, the panning direction of the imaging unit 120 is the same as the shooting direction selected by the user.

The main body 110 may be automatically panned using a motor (not shown) or manually panned.

For example, when the rightward direction is selected, the main body 110 is panned to the right, and a right side image of the object is acquired.

The imaging apparatus 100 determines the current progress angle during creation of the panoramic image (207). In this regard, the imaging apparatus 100 displays a previously captured image on a portion of the display unit 140 as a preview.

The determining of the progress angle includes determining a viewing angle corresponding to a focal length, checking a rotation angle of the main body 110 detected by the detection unit 170, and determining the progress angle based on the determined viewing angle and checked rotation angle.

The imaging apparatus 100 determines a remaining angle to complete creation of the panoramic image based on the maximum angle and the progress angle and displays the determined remaining angle in real-time using a progress bar (208).

Here, a remaining distance may also be determined based on the remaining angle.

In addition, a lateral distance of the acquired image may also be determined based on the progress angle.

For example, a ratio of the progress angle to the remaining angle is calculated, and a lateral distance of the captured image is calculated when the rightward shooting direction is selected. Then, the remaining distance with respect to the remaining angle may also be determined based on the calculated distance and ratio.

When the rightward shooting direction is selected, a distance between a left edge of the first image and a right edge of the currently captured image may be determined.

In addition, the imaging apparatus 100 displays the degree of progress in creating the panoramic image using the progress bar. Here, the progress bar increases in size as the degree of progress, i.e., the progress angle, increases.

The imaging apparatus 100 may also display the initial angle, the progress angle, and the maximum angle on the progress bar. Here, the initial angle is 0°.

In this regard, a method of displaying shooting angle information for creating the panoramic image on the display unit 140 of the imaging apparatus 100 may be determined by an output mode selected by the user.

Examples of the method of displaying shooting angle information for creating a panoramic image will be described later with reference to FIGS. 5 to 11.

The imaging apparatus 100 determines whether the progress angle is equal to the maximum angle (209). Upon determination that the progress angle is equal to the maximum angle, the imaging apparatus 100 stops the panoramic image creation operation.

The imaging apparatus 100 determines whether a command to stop the image capture operation is input by the user (210). Upon determination that the command to stop the image capture operation is input by the user, operation of the imaging unit 120 is stopped to cease the panoramic image creation operation.

When the progress angle is not equal to the maximum angle or the command to stop the image capture operation is not input, the imaging apparatus 100 continuously performs the panoramic image creation operation and displays the progress angle and the remaining angle in real-time.

Upon determination that a view mode is the viewfinder mode when the command to create the panoramic image is input, the imaging apparatus 100 stops operation of the display unit and performs the panoramic image creation operation while panning the main body 110.

Here, the imaging apparatus 100 may determine the progress angle and the remaining angle while performing the panoramic image creation operation and may also output information regarding the progress angle and the remaining angle using sounds.

For example, when the maximum angle is 180°, the current progress angle is notified using a sound. When the current progress angle is about 160°, a sound notifying that the progress angle approaches the maximum angle is output. When the progress angle is 180°, a sound notifying the end of the panoramic image creation operation may be output.

A method of displaying shooting angle information for creating a panoramic image will be described.

Figure 5:
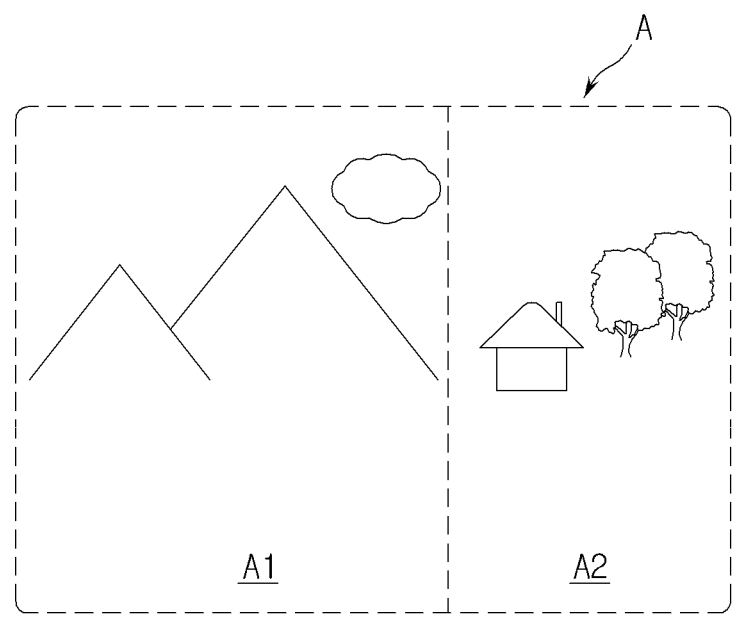
FIGS. 5 through 11 illustrate example displays of a display unit of the imaging apparatus of FIG. 1, according to various embodiments.
Figure 5:
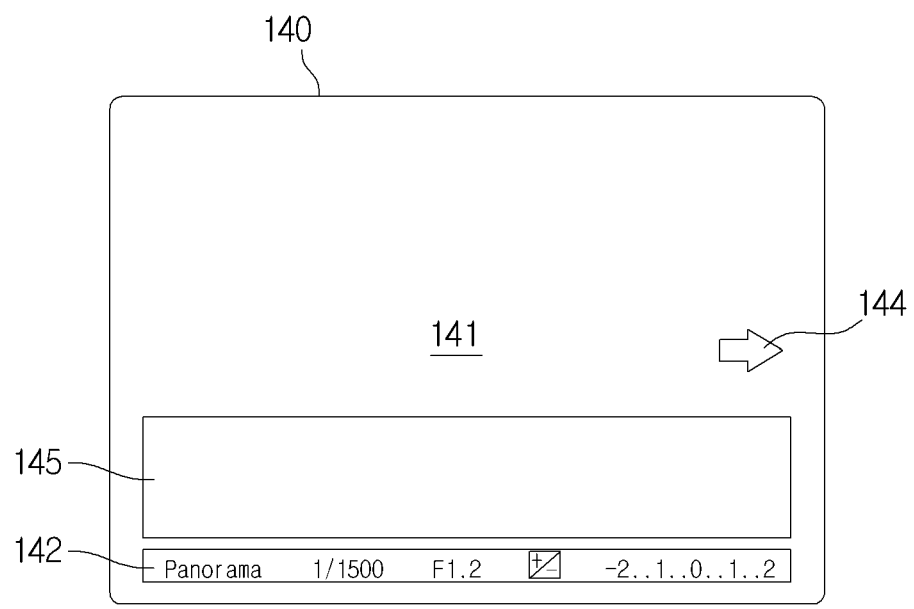

As illustrated in FIG. 5, when a panoramic image A of an object is created, one portion of the whole panoramic image A created using previously captured images is referred to as A1, and the other portion of the whole panoramic image to be further captured is referred to as A2.

As illustrated in FIG. 5, the imaging apparatus 100 displays an option setting information display unit 142 on a portion of the display unit 140, a shooting direction-indication unit 144 on another portion of the display unit 140 (e.g., the shooting direction display unit 143), and a progress bar 145 that is a unit indicating the degree of progress in creating the panoramic image on another portion of the display unit 140 after a panorama mode is selected and before a command to initiate shooting is input.

The progress bar 145 indicates the current progress angle relative to the maximum angle based on the degree of progress in creating the panoramic image. The progress bar 145 may indicate the progress angle and the remaining angle differently.

Here, when the focal length is adjusted by the user, the maximum angle changes in response to the adjusted focal length.

Figure 6A:
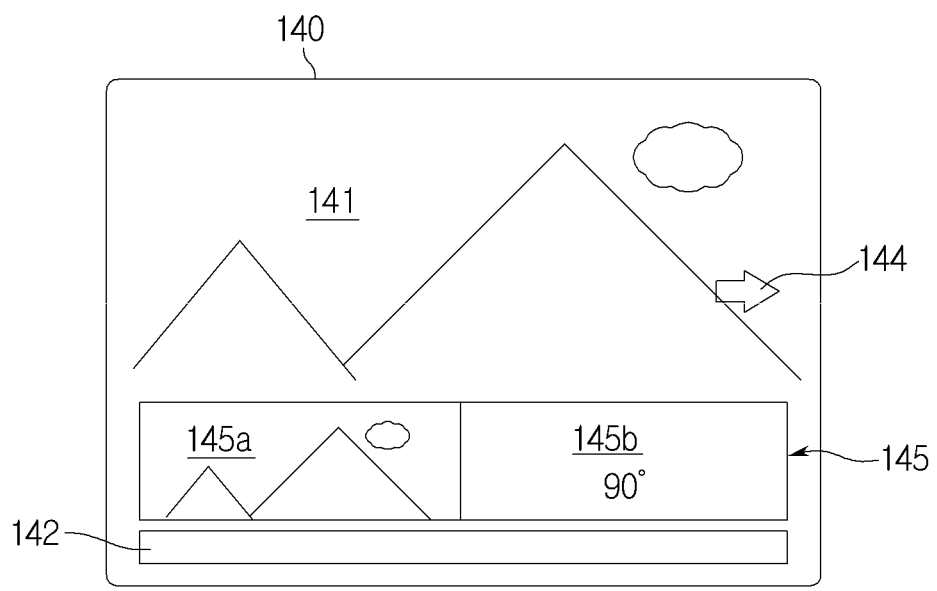
Figure 6B:
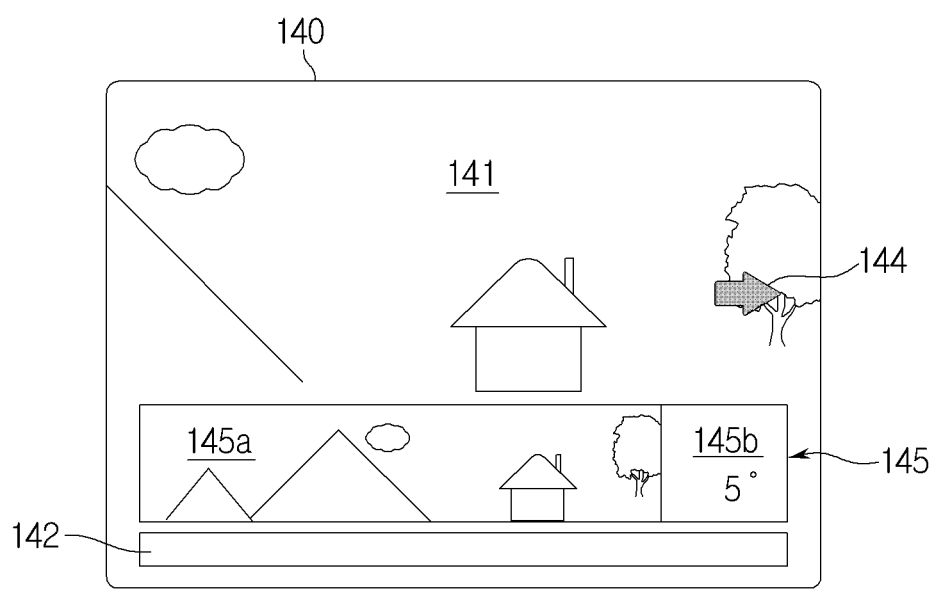

An example of displaying shooting angle information for creating a panoramic image will be described with reference to FIGS. 6A and 6B. FIGS. 6A and 6B illustrate that a panoramic image is created in a rightward shooting direction.

As illustrated in FIG. 6A, when a command to initiate the panoramic image creation operation is input, the imaging apparatus 100 displays a live view of an object captured by the imaging unit on the display unit 140.

Then, the option setting information display unit 142 may be displayed on a portion of the display unit 140 in a state of overlapping the image display unit 141 in which a live view is displayed. The shooting direction-indication unit 144 indicating the rightward shooting direction is displayed on another portion of the display unit 140, and the progress bar 145 that indicates the degree of progress in creating the panoramic image is displayed, as a horizontal bar, on another portion of the display unit 140.

The progress bar 145 includes a completed portion 145a displaying a portion of the whole panoramic image created using previously captured images as a preview and a remaining portion 145b indicating the remaining angle, for example, as characters or text.

As illustrated in FIG. 6B, the completed portion 145a gradually increases in size as the panoramic image creation operation proceeds, so that all captured images are displayed as a preview. The remaining portion 145b gradually decreases in size as the panoramic image creation operation proceeds, so that the number indicating the remaining angle is changed.

For example, as the panoramic image creation operation proceeds, the progress angle increases, and the remaining angle decreases.

When the shooting direction-indication unit 144 is not visible as the image of the object overlaps the shooting direction-indication unit 144, the shooting direction-indication unit 144 may be displayed by changing colors, or the like.

Figure 7:
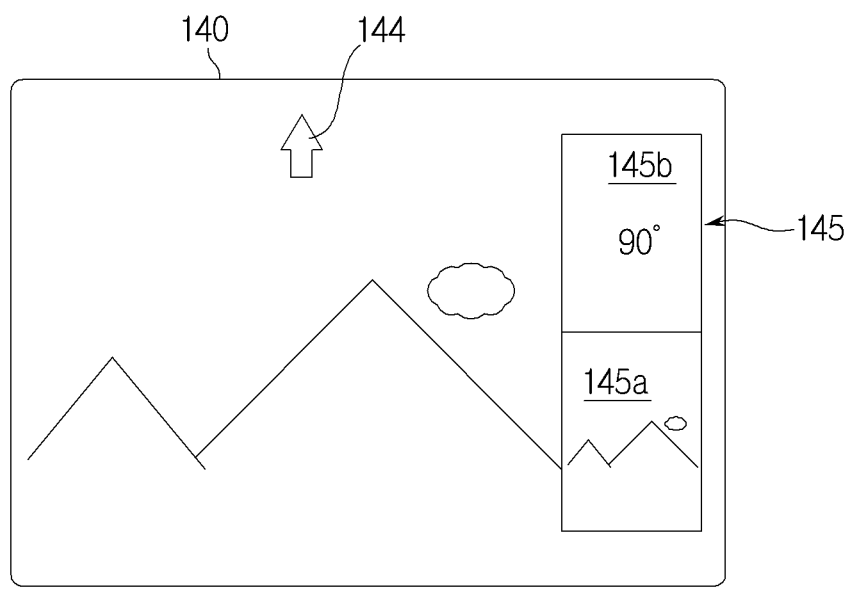

Another example of displaying shooting angle information for creating a panoramic image will be described with reference to FIG. 7. FIG. 7 illustrates that a panoramic image is created in the upward shooting direction.

As illustrated in FIG. 7, when a command to initiate the panoramic image creation operation is input, the imaging apparatus 100 displays a live view of an object captured by the imaging unit on the display unit 140.

Then, the option setting information display unit 142 may be displayed on a portion of the display unit 140 in a state of overlapping the image display unit 141 in which a live view is displayed.

The shooting direction-indication unit 144 indicating the upward shooting direction is displayed on another portion of the display unit 140, and the progress bar 145 that indicates the degree of progress in creating the panoramic image is displayed, as a vertical bar, on another portion of the display unit 140.

The progress bar 145 includes a completed portion 145a displaying a portion of the whole panoramic image created using previously captured images as a preview and a remaining portion 145b indicating the remaining angle, for example, as characters or text.

In addition, the completed portion 145a gradually increases in size as the panoramic image creation operation proceeds, so that all captured images are displayed as a preview. The remaining portion 145b gradually decreases in size as the panoramic image creation operation proceeds, so that the number indicating the remaining angle is changed.

Another example of displaying shooting angle information for creating a panoramic image will be described with reference to FIG. 8.

When a command to initiate the panoramic image creation operation is input, the imaging apparatus 100 displays a live view of an object captured by the imaging unit on the display unit 140.

Then, the option setting information display unit 142 may be displayed on a portion of the display unit 140 in a state of overlapping the image display unit 141 in which a live view is displayed. The shooting direction-indication unit 144 indicating the rightward shooting direction is displayed on another portion of the display unit 140.

In addition, the progress bar 145 that indicates the degree of progress in creating the panoramic image is displayed, as a horizontal bar, on another portion of the display unit 140, and a shooting angle bar 145c is displayed adjacent to the progress bar 145.

Here, the progress bar 145 includes a completed portion 145a displaying a portion of the whole panoramic image created using previously captured images as a preview and a remaining portion 145b indicating the remaining angle as characters.

For example, the shooting angle bar 145c is disposed at an upper portion of the completed portion 145a and the remaining portion 145b in the display unit 140.

Here, the shooting angle bar 145c is oriented in a direction in which the progress bar 145 proceeds.

The shooting angle bar 145c indicates the initial angle, the maximum angle, and the progress angle.

The shooting angle bar 145c indicates the initial angle at a first end of the progress bar 145, indicates the maximum angle at a second end of the progress bar 145, and indicates the progress angle between the first and second ends. Here, an angle disposed at the border between the completed portion 145a and the remaining portion 145b indicates the current progress angle.

Figure 8:
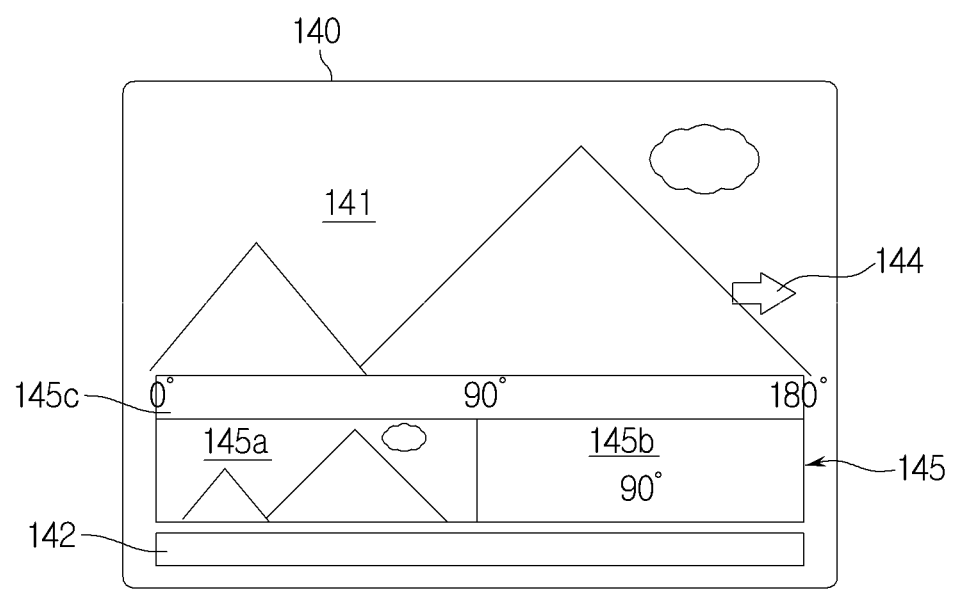

For example, in FIG. 8, the initial angle is 0°, the maximum angle is 180°, and the progress angle is 90°.

In this regard, the completed portion 145a displays a preview image, and the remaining portion 145b is left blank or filled with a preset color. The user may determine the degree of progress or the remaining percentage based on the border between the completed portion 145a and the remaining portion 145b.

In addition, the completed portion 145a gradually increases in size as the panoramic image creation operation proceeds, so that all captured images are displayed as a preview. The remaining portion 145b gradually decreases in size as the panoramic image creation operation proceeds.

For example, as the panoramic image creation operation proceeds, the progress angle increases, and the remaining angle decreases.

Figure 9:
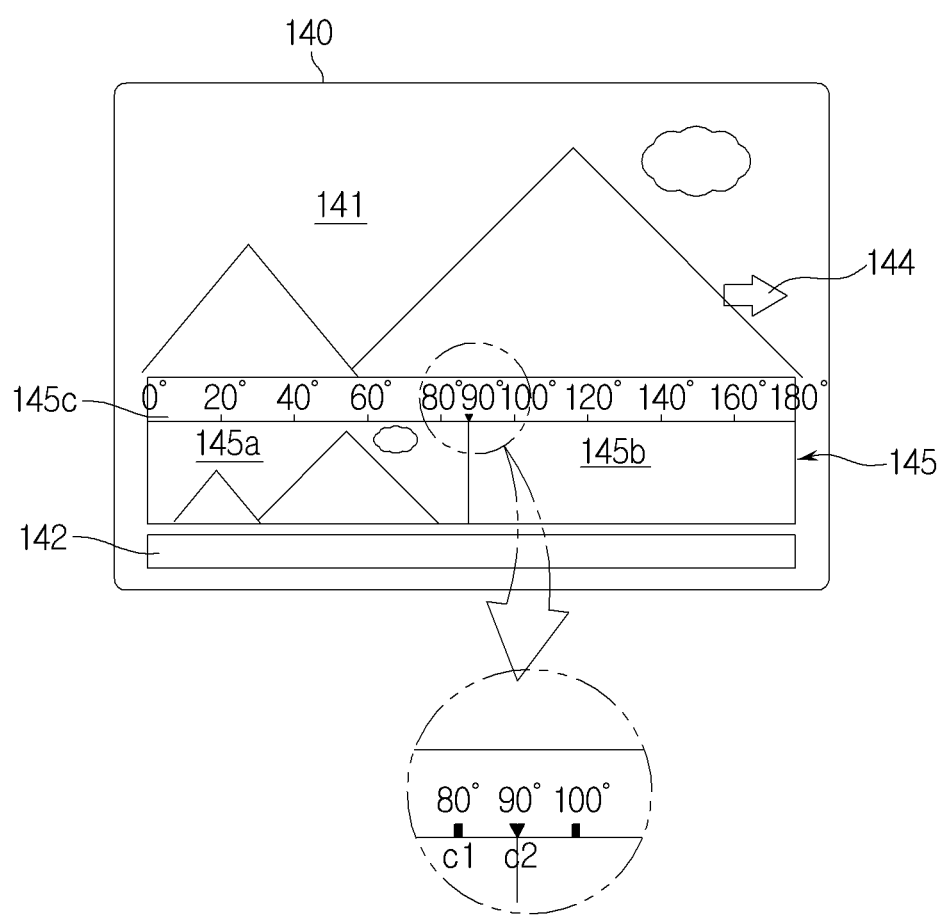

Another example of displaying shooting angle information for creating a panoramic image will be described with reference to FIG. 9.

When a command to initiate the panoramic image creation operation is input, the imaging apparatus 100 displays a live view of an object captured by the imaging unit on the display unit 140.

Then, the option setting information display unit 142 may be displayed on the display unit 140 in a state of overlapping the image display unit 141 in which a live view is displayed. Here, the option setting information display unit 142 is displayed on a portion of the display unit 140.

The shooting direction-indication unit 144 indicating the rightward shooting direction is displayed on another portion of the display unit 140.

In addition, the progress bar 145 that indicates the degree of progress in creating the panoramic image is displayed, as a horizontal bar, on another portion of the display unit 140, and a shooting angle bar 145c is displayed adjacent to the progress bar 145.

Here, the progress bar 145 includes a completed portion 145a displaying a portion of the whole panoramic image created using previously captured images as a preview and a remaining portion 145b is left blank or filled with a preset color. For example, the shooting angle bar 145c is disposed at an upper portion of the completed portion 145a and the remaining portion 145b in the display unit 140.

Here, the shooting angle bar 145c is oriented in a direction in which the progress bar 145 proceeds.

The shooting angle bar 145c indicates the initial angle, the maximum angle, and the progress angle and indicates angles at intervals of a predetermined angle.

For example, when the predetermined angle is 20°, the angles are disposed on the shooting angle bar 145c from the initial angle to the maximum angle at intervals of 20°, for example, 20°, 40°, 60°, 80°, 100°, 120°, and 140° are disposed.

Here, the predetermined angle may vary, for example, may be 10°, 30°, 50°, or the like.

The shooting angle bar 145c indicates the initial angle at a first end of the progress bar 145, indicates the maximum angle at a second end of the progress bar 145, and indicates the progress angle between the first and second ends. Here, an angle disposed at the border between the completed portion 145a and the remaining portion 145b indicates the current progress angle.

A scale mark c1 indicating the predetermined angle may have a bar shape, and a scale mark c2 indicating the progress angle may have an inverted triangle shape. For example, the scales marks respectively indicating the predetermined angle and the progress angle may have different shapes.

In addition, when the progress angle is equal to the predetermined angle, the display unit may change the bar shape to the inverted triangle shape.

For example, when the predetermined angles are 20°, 40°, 60°, 80°, 100°, 120°, and 140°, and the progress angle is 80°, the scale mark indicating 80° may be changed from the bar shape to the inverted triangle shape.

In this regard, the completed portion 145a of the progress bar 145 displays a preview image, and the remaining portion 145b is left blank or filled with a preset color.

The shooting angle bar 145c is displayed in a state of overlapping the live view image while the background except for the characters indicating the angles may be transparent or semi-transparent.

The user may determine the degree of progress or the remaining percentage based on the border between the completed portion 145a and the remaining portion 145b.

In addition, the completed portion 145a gradually increases in size as the panoramic image creation operation proceeds, so that all captured images are displayed as a preview. The remaining portion 145b gradually decreases in size as the panoramic image creation operation proceeds.

Figure 10:
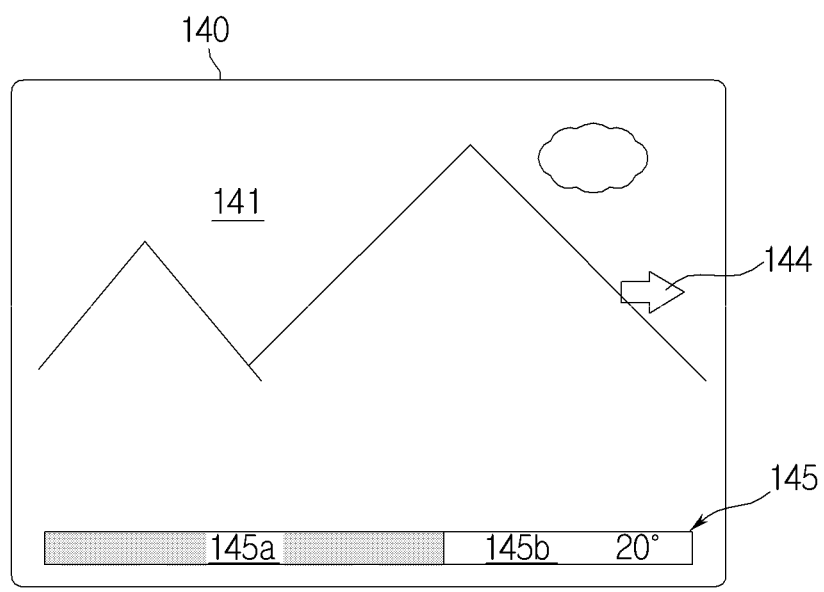

Another example of displaying shooting angle information for creating a panoramic image will be described with reference to FIG. 10.

When a command to initiate the panoramic image creation operation is input, the imaging apparatus 100 displays a live view of an object captured by the imaging unit on the display unit 140.

The shooting direction-indication unit 144 indicating the rightward shooting direction is displayed on another portion of the display unit 140.

In addition, the progress bar 145 that indicates the degree of progress in creating the panoramic image is displayed, as a horizontal bar, on another portion of the display unit 140.

Here, the progress bar 145 includes a completed portion 145a displaying a portion of the whole panoramic image created using previously captured images as a preview and a remaining portion 145b indicating the remaining angle as characters.

In this regard, the remaining portion 145b of the progress bar 145 may be left blank or filled with a preset color which is different from the color of the completed portion 145a.

In addition, the remaining portion 145b and the completed portion 145a are displayed in a state of overlapping the live view image while the background except for the characters indicating the angles may be transparent or semi-transparent.

The user may determine the degree of progress or the remaining percentage based on the border between the completed portion 145a and the remaining portion 145b.

In addition, the completed portion 145a gradually increases in size as the panoramic image creation operation proceeds. The remaining portion 145b gradually decreases in size as the panoramic image creation operation proceeds.

Figure 11:
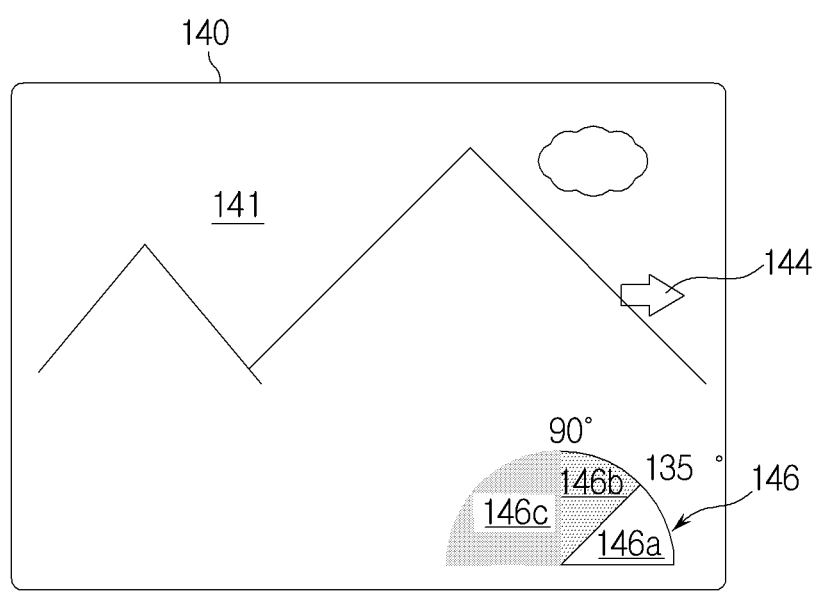

Another example of displaying shooting angle information for creating a panoramic image will be described with reference to FIG. 11.

When a command to initiate the panoramic image creation operation is input, the imaging apparatus 100 displays a live view of an object captured by the imaging unit on the display unit 140.

The shooting direction-indication unit 144 indicating the rightward shooting direction is displayed on another portion of the display unit 140.

In addition, a progress state indicator is horizontally displayed on another portion of the display unit 140. In this regard, the progress state indicator has a shape of a goniometer 146.

The goniometer 146 displays a range of angles 146a to which the imaging apparatus 100 is able to create a panoramic image, displays a maximum angle range 146b corresponding to a currently adjusted focal length, and displays a progress angle range 146c.

Here, the range of angles to which the imaging apparatus 100 is able to create the panoramic image is 180°, the maximum angle corresponding to the currently adjusted focal length is 135°, and the progress angle is 90°. The user may recognize that the remaining angle to be captured is 45°.

As described above, since the degree of progress is displayed using the goniometer 146, the user may estimate how far the main body may be further rotated.

In addition, the current progress angle may be displayed as a blank or a preset color, and the remaining angle may be displayed as characters.

Here, the progress angle and the remaining angle may be displayed using different colors.

The user may determine the degree of progress or the remaining percentage based on the border between the progress angle and the remaining angle.

In addition, the progress angle range gradually increases in size as the panoramic image creation operation proceeds, and the remaining angle range gradually decreases in size as the panoramic image creation operation proceeds.

Although a few embodiments of the invention have been shown and described, it will be appreciated by those skilled in the art that changes may be made in these embodiments without departing from the principles and spirit of the invention, the scope of which is defined in the claims and their equivalents.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The invention claimed is:

1. An imaging apparatus comprising:
a main body;
an imaging unit mounted on the main body that captures an image of an object;
an input configured to receive a command to capture the image;
a detector configured to detect a rotation angle of the main body;
a controller that controls operation of the imaging unit to create a panoramic image when a panorama mode is input to the input and that determines a current progress angle and a remaining angle to complete creation of the panoramic image based on the detected rotation angle during creation of the panoramic image;
a display configured to display the remaining angle as characters for creation of the panoramic image with a live view using a progress bar;
wherein the progress bar includes a portion that displays the remaining angle as characters; and
a storage configured to store a maximum angle of the panoramic image, wherein the maximum angle is based on a focal length,
wherein the controller checks the maximum angle, adjusted by the input, for creation of the panoramic image while shooting and controls display of the checked maximum angle as characters.

2. The imaging apparatus according to claim 1, wherein the display is configured to display the current progress angle and the maximum angle adjacent to the progress bar.

3. The imaging apparatus according to claim 2, wherein the display vertically displays the progress bar when the panoramic image is created by vertically rotating the main body with respect to an axis of a lens of the imaging unit and horizontally displays the progress bar when the panoramic image is created by horizontally rotating the main body with respect to the axis of the lens of the imaging unit.

4. The imaging apparatus according to claim 2, wherein the progress bar indicates the current progress angle relative to the maximum angle based on the degree of progress during creation of the panoramic image and indicates the current progress angle and the remaining angle differently.

5. The imaging apparatus according to claim 2, wherein the progress bar further includes a completed portion that displays previously captured images.

6. The imaging apparatus according to claim 1, wherein the display further comprises a shooting angle bar, disposed adjacent to the progress bar parallel to a direction in which the progress bar proceeds,
wherein the shooting angle bar indicates an initial angle, a maximum angle, and a progress angle as characters.

7. The imaging apparatus according to claim 6, wherein the shooting angle bar further indicates angles at intervals of a predetermined angle.

8. The imaging apparatus according to claim 7, wherein the shooting angle bar comprises scale marks that indicate the predetermined angles.

9. The imaging apparatus according to claim 6, wherein the shooting angle bar indicates the initial angle at a first end of the progress bar, indicates the maximum angle at a second end of the progress bar, and indicates the current progress angle between the first end and the second end.

10. The imaging apparatus according to claim 1, wherein the display is configured to display a shooting direction of the panoramic image using a shooting direction-indication unit.

11. The imaging apparatus according to claim 1, wherein the input is configured to receive a view mode, and
wherein the controller controls operation of the display when the view mode is converted from a live view mode into a viewfinder mode.

12. The imaging apparatus according to claim 11, further comprising a sound output unit to output sounds,
wherein the controller controls the sound output unit to output shooting angle information as a sound for creation of the panoramic image.

13. An imaging apparatus comprising:
a main body;
an imaging unit mounted on the main body and that captures an image of an object;
a storage configured to store a maximum angle of a panoramic image, wherein the maximum angle is based on a focal length;
an input configured to receive a command to capture the image and receive a view mode;
a detector that detects a rotation angle of the main body;
a sound output configured to output sounds;
a controller that checks the focal length of the imaging unit when a panorama mode is input, checks the maximum angle, and checks a viewing angle corresponding to the checked focal length, determines a current progress angle based on the checked viewing angle and the detected rotation angle of a panoramic image creation operation, and determines a remaining angle to complete creation of the panoramic image based on the maximum angle and the current progress angle when the view mode is a live view mode; and
a display configured to display the remaining angle as characters;
wherein the display further displays both the current progress angle and the maximum angle as characters; and
wherein, when the current progress angle is less than the maximum angle by a preset angle, the controller controls output of a first sound, and when the current progress angle is equal to the maximum angle, controls output of a second sound.

14. A method of controlling an imaging apparatus, the method comprising:
checking a focal length of an imaging unit when a panorama mode is input to an input;
checking a maximum angle for a panoramic image, wherein the maximum angle is based on the focal length;
checking a viewing angle corresponding to the checked focal length;
performing a panoramic image creation operation by operating the imaging unit when a panoramic image creation operation is input to the input;
detecting a rotation angle of a main body while creating the panoramic image;
determining a current progress angle based on the checked viewing angle and the detected rotation angle while creating the panoramic image;
determining a remaining angle to complete creation of the panoramic image based on the maximum angle and the current progress angle; and
displaying the determined remaining angle as characters on a display;
wherein the remaining angle is displayed using a progress bar; and
wherein the progress bar includes a portion that displays the remaining angle as characters;
further comprising displaying the maximum angle and the current progress angle as characters on the display.

15. The method according to claim 14, wherein the progress bar has a first portion displaying a preview image and a second portion displaying the remaining angle as characters.

16. The method according to claim 14, further comprising displaying a shooting angle bar adjacent to the progress bar.

17. The method according to claim 14, further comprising:
determining a shooting direction for the panoramic image creation operation; and
vertically displaying the progress bar when the shooting direction is a vertical direction and horizontally displaying the progress bar when the shooting direction is a horizontal direction.

18. The method according to claim 14, further comprising:
determining whether the current progress angle is equal to the maximum angle; and
stopping the panoramic image creation operation when the current progress angle is equal to the maximum angle.

19. The method according to claim 14, further comprising:
determining whether a command to stop the panoramic image creation operation is input to the input; and
stopping the panoramic image creation operation when the command to stop the panoramic image creation operation is input.

* * * * *